Patented June 10, 1930

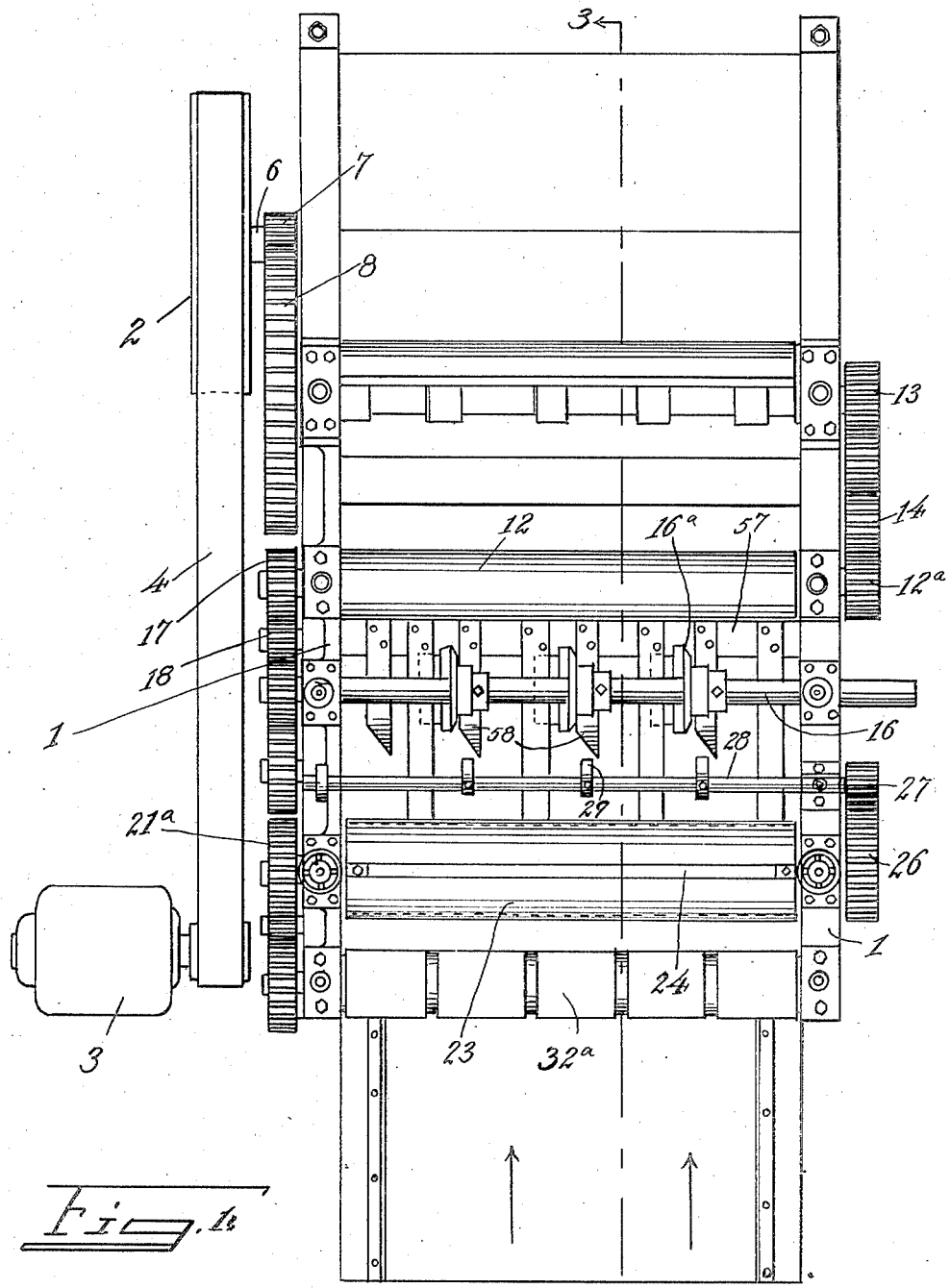

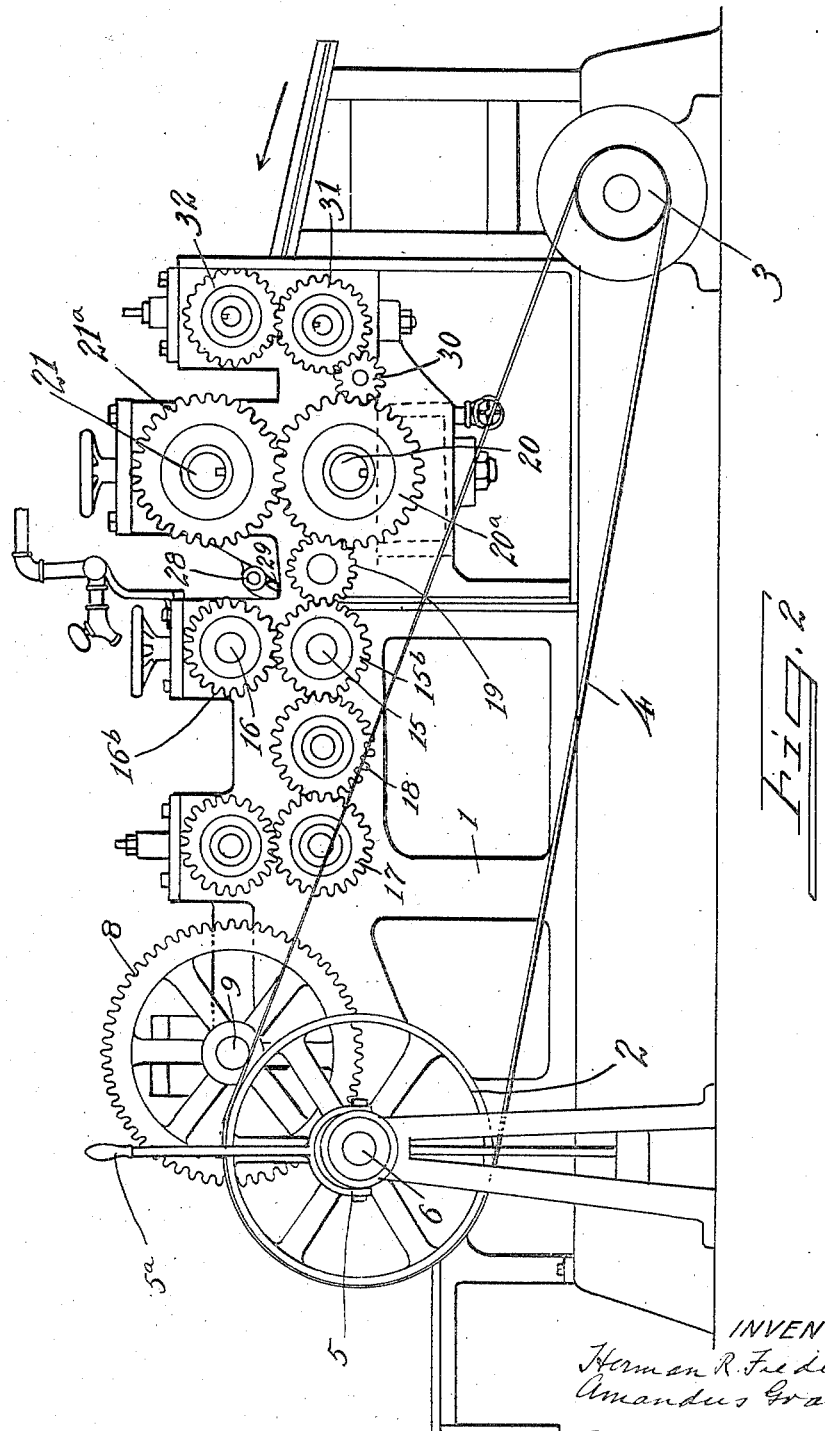

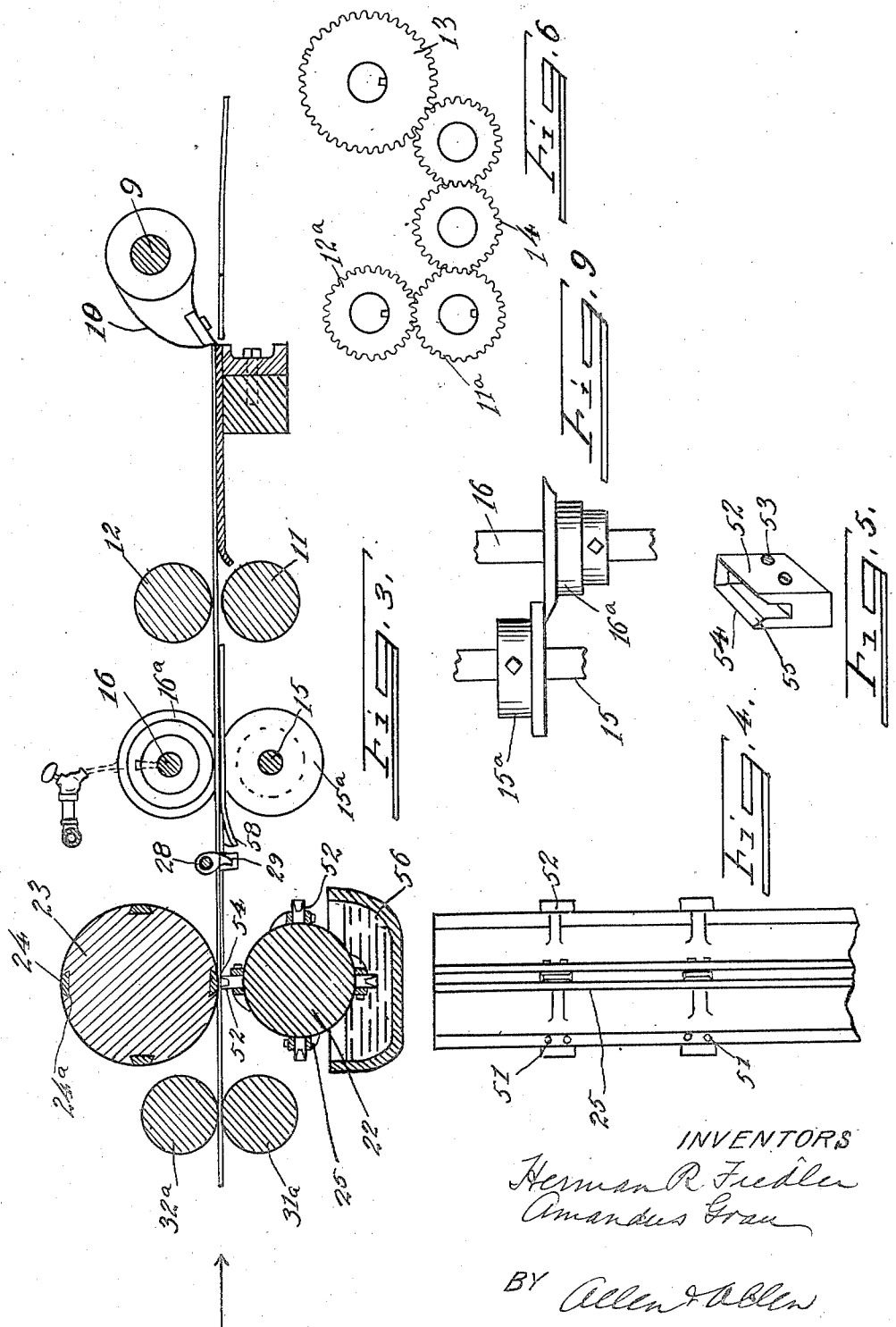

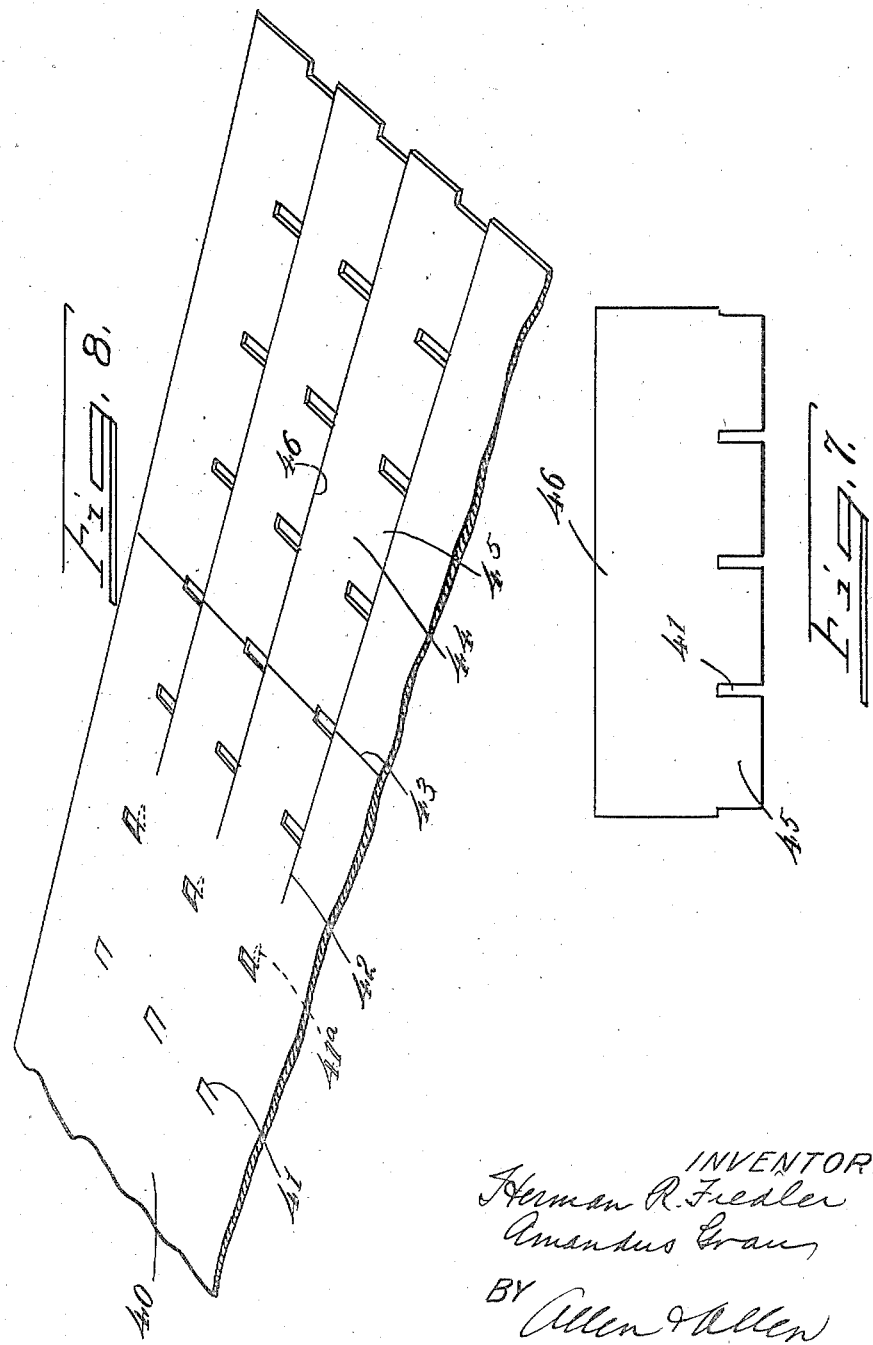

1,762,330

UNITED STATES PATENT OFFICE

HERMAN R. FIEDLER, OF LOCKLAND, AND AMANDUS GRAU, OF SHARON, OHIO, AS-SIGNORS, BY MESNE ASSIGNMENTS, TO THE PATENT AND LICENSING CORPORATION, OF BOSTON, MASSACHUSETTS, A CORPORATION OF MASSACHUSETTS

STRIP-SHINGLE-CUTTING MACHINE

Application filed May 19, 1924. Serial No. 714,268.

Our invention relates to devices for cutting out slabs from a sheet of prepared roofing material, in which notches are ultimately formed in the slabs to imitate a spacing between tabs, similar to shingles or tiles.

The type of strip shingle illustrated in our drawings, and which the particular machine is designed to produce, is but one of the shapes which may be made according to our invention, and we wish it understood that we have selected this exact style of shingle for purposes of illustration of our invention.

The object in machines of the character noted, is to cut out from a large sheet, a series of slabs, each slab having a continuous body portion and a series of projections along the edge to be exposed on the roof, said projections being spaced apart, so as to give the effect of a number of individual pieces.

In order to accomplish this purpose, it is necessary to cut narrow short strips out of the sheet and to slit the sheet and cut it into lengths so that the cut-outs register with the edge of the completed article. It is our object to provide a machine which forms the cut-outs so that they extend crosswise of the sheet, and to slit the sheet lengthwise to leave the cut-outs in registry with the line of slit.

It is our object to provide means whereby the cut-outs are not died out of the sheet in the customary manner, but instead are first cut around three sides, and the material thus freed then bent down, so as to clear the three sides cut. The lengthwise slitting of the sheet then forms the fourth cut, finishing the cut-out, during the operation of forming the edge of the sheet.

By this mode of operation we provide a very effective way of clearing away the cut-outs, from the roofing sheet, which is the outstanding problem in machines for like purposes with which we are familiar. Roofing material formed of a felt base, saturated and coated with bituminous materials, is not an easy material to handle in view of the fact that the bituminous materials are sticky, and tend to remain in the dies, or to stay in place in the roofing strips. The clearing of the dies in machines of this type has always been a great problem, and our solution of the same permits of a very rapid action, and high quantity production, with a minimum amount of spoiled material.

We accomplish our said objects by that certain construction and arrangement of parts to be hereinafter more specifically pointed out and claimed.

In the drawings:

Figure 1 is a plan view of the machine.

Figure 2 is a side elevation thereof.

Figure 3 is a detail section, arranged as a diagram to illustrate the mode of operation of the machine, and taken from the opposite side from Figure 2.

Figure 4 is a detail plan view of one of the die rolls.

Figure 5 is a perspective view of a three sided die.

Figure 6 is a side elevational detail of the gearing on the opposite side of the machine from Figure 2.

Figure 7 is a plan view of the final product.

Figure 8 is a perspective view of a sheet of roofing materials, showing the several steps of operation thereon, as it passes through the machine.

Figure 9 is a plan view showing the operation of the slitter.

The machine is formed on a framework generally noted at 1, the power being applied to a pulley 2 from a driving motor 3, by means of a belt 4. A clutch 5 provided for coupling and uncoupling the drive, is operated by a handle 5ª, and is located at the delivery end of the machine.

The pulley 2 is coupled with shaft 6 by the clutch and this shaft carries a gear 7, meshing with a large gear 8. The gear 8 is mounted on the spindle 9 of the fly knife 10.

The feed rolls 11, 12 mounted in the frame, and coming next before the fly knife, are driven from the fly knife shaft on gears on the opposite side of the machine from the motor and pulley (Figures 6 and 1). Thus the said shaft 9 has a gear 13 thereon, meshing with a gear train 14, which drives the gears 11ª and 12ª of the two feed rolls.

The slitters are formed by spindles 15 and 16 with the slitters 15ª and 16ª thereon, same being of usual pattern and designed to make a continuous slit at selected lines through a roofing strip passing through the machine. The drive gears 15ᵇ and 16ᵇ for the two spindles 15 and 16, are driven by gears on the motor and pulley side of the machine. Thus the lower feed roll spindle gear 17 on the side of the machine away from gear 11ª thereof, drives an idler gear 18, which idler meshes with the lower of the two gears 15ᵇ for the slitters.

An idler 19 meshes with the gear 15ᵇ and drives the gears 20ª, 21ª on the spindles 20 and 21 of the primary cutters. These primary cutters are in the form of drums 22, 23, the drum 23 having strips of soft metal 24 set in lengthwise lines therein, and the drum 22 having die mounting elements 25, extending lengthwise thereof in which the primary cutters are adjustably arranged.

The upper spindle 20 has a gear 26 on its non-driven end, which gear drives a gear 27 on a tripper shaft 28, said shaft having trippers in the shape of fingers 29.

The gear 20ª drives an idler 30 which meshes with the feed roll gears 31, 32, of a lower and upper in-feed roller 31ª, 32ª.

Referring more particularly to the several elements which act on the roofing piece, we will first describe the product and trace the steps through which it passes in the machine. In Figure 8 is shown a strip of roofing, which enters the machine in an uncut stage as at 40. The operation of the primary cutters or dies is to cut out three-sided slits 41, in the piece, thereby liberating a tab 41ª, which is deflected away from the three-sided hole, as will be noted. The slitters then come into play forming a line of cuts 42 lengthwise of the long strip, this line of cuts severing the fourth side of the tabs, and forming single width, long and narrow strips out of the main sheet. The fly knife then chops across the piece at the line 43, thereby forming a series of strips 44, having shingle-like projections 45, and bodies 46 which are continuous. The fly knife is timed to form its cut directly through the center of the holes left in the slab by the combined action of the primary cutters and the slitters.

In Figure 7 is shown the unit 44, which is adapted to be laid on a roof in courses, and is not a novelty in and of itself, being known as a "strip shingle," and simulating a number of shingles in one, since in laying the overlap of courses is such as to conceal the continuous body portions 46 from view.

Referring next to the two drums 22 and 23, in Figure 3, the soft metal inserts 24 in the drum 23 may be extended the full length thereof, and we find that for ready renewal, it is best to dovetail the drum and provide the soft metal inserts in dovetailed form as illustrated in Figure 3 at 24ª.

In order to permit of adjustment and replacement of the primary cutters, we provide the lengthwise bars 25, either in pairs, or in the form of channels as shown, between which bars the cutters are set, and bolted as indicated at 51. The cutters themselves have bodies 52, which are hollow, and pierced with holes 53 for passage of the mounting bolts, said bolts passing through holes in the members 25.

The cutting edges 54 are three-sided in the form shown, so that the roofing piece is slit and not died out by the operation. As the roofing piece passes through the machine, the soft metal portions of the upper drum 23 register with the cutters in the lower drum, and the action of the cutter will be to pass up through the roofing from the non-slate surface side, and then pass down again, drawing the freed end of the tab out partially. The beveling of the cutting edges indicated at 55, results in the clean cutting out of the three-sided tabs, leaving the edges clean, and covered with the asphalt coating of the roofing sheet.

The drum 22 is located over a water pan 56, so that the cutters are lubricated by water (Figure 3).

Mounted on a cross member 57 of the frame of the machine are a series of deflector fingers 58, which are arranged suitably with relation to the slitters on the two slitter shafts, so as to engage and turn down the tongues 41ª, formed in the roofing strip by the primary cutters. The timing of the trippers 29 will be such that they will strike down any tongues which because of peculiarity of action are not pulled down by the withdrawal of the primary cutters from the roofing piece. In regular practice, the trippers are used as a precautionary element of the machine, since the tongues will always be deflected enough by the dieing operation to be engaged and folded clear down, by means of the fingers 58.

We have indicated adjustable bearings for the spindles of the primary cutter drums, and several feed rolls and slitters, but such devices are familiar in practice and do not require explanation.

It should be noted that the slitters are adjusted on their spindles by means of collar and set screw mounting, which is ordinary practice, and that the machine is so built generally that by easy shifting about and changes in shape of cutters, fly knife, deflectors and the like, it may be adapted for cutting out strip shingles of a variety of patterns.

It is a decided advantage to have the primary cutters struck up through the roofing strip from the non-slate surfaced side, where slate surfaced roofing is being cut-out. This saves the knives themselves, and furthermore results in the bituminous coating of the roofing strip being smeared about the edges of the cut, rather than that the slate is forced down around the edges of the cut, leaving a rough appearance, liable to more rapid deterioration than a properly protected edge. It is an apparently slight difference in nature of exposed portions of composition shingles which gives them long life and permanence of appearance.

Referring briefly to the operation of the machine, a piece of roofing in the form of a sheet is led to the machine, where it is seized by the feed rolls 31ª, 32ª, thence passes between the drums 22 and 23, of the primary cutters, thence passes to the slitters 15ª and 16ª, which divide the strip lengthwise and also cut away the tongues which have been left from the primary cutters, and have been deflected during the travel of the sheet from the primary cutters to the slitters. The sheet then passes through the feed rollers 11 and 12, and thence to the fly knife, which chops the entire piece across, thereby redividing the strips cut lengthwise from the sheet, into units or sections ready for mounting on the roof.

The speed of operation of the machine described can be very high without resulting in a failure to clear the notches in the edges of the units. To modify the distance apart of the notches in the units, the fly knife drive gear can be altered.

It will be evident that modifications in the mechanism shown and described can be made without departing from the spirit of our invention, the essentials of which are the mode of cutting out the notches in the several strips by first severing three sides, then bending down the tongue so liberated and finally cutting out the tongue in the operation of slitting the wide strip into roofing units.

Having thus described our invention, what we claim as new and desire to secure by Letters Patent, is:—

1. In a roofing machine the combination with means for feeding a strip of roofing material, of dies entering the material from below for liberating a series of tongues from said strip as it is fed, means for deflecting said tongues and a slitter for severing the strip lengthwise along a line which will sever said tongues, for the purpose described.

2. In a roofing machine the combination with means for feeding a strip of roofing material, of dies adapted to cut the strip and to partially withdraw from the strip a series of tongues in a row lengthwise of the strip, means disposed in the path of said partially withdrawn tongues to further deflect said tongues, and means for severing said strip lengthwise along a continuous line which will sever said tongues, for the purpose described.

3. In a roofing machine the combination with means for feeding a strip of roofing material, a rotary cutter, and a rotary base against which the cutter operates, said cutter having a die for liberating tongues in the roofing strip, a deflector located in line with the die and adapted to engage the liberated tongue and deflect it out of the plane of the roofing strip, and a slitter located to cut the roofing strip, lengthwise along the bases of said tongues, for the purpose described.

4. In a roofing machine the combination with means for feeding a strip of roofing material, a rotary cutter, and a rotary base against which the cutter operates, said cutter having a die for liberating tongues in the roofing strip, a deflector located in line with the die and adapted to engage the liberated tongue and deflect it out of the plane of the roofing strip, and a slitter located to cut the roofing strip lengthwise along the bases of said tongues, for the purpose described, said rotary cutter with its die being located beneath the roofing strip as it passes through the machine, and the deflector being also located beneath the strip.

5. In a roofing machine the combination with means for feeding a strip of roofing material, of dies entering the material from below for liberating a series of tongues from said strip as it is fed, means for deflecting said tongues, and a slitter for severing the strip lengthwise along a line which will sever said tongues, and a tripper device located above the roofing strip and operated so as to force downwardly into engagement with the deflector means, the tongues liberated in the strip.

6. In a roofing machine the combination with means for feeding a strip of roofing material, of dies adapted to enter the material from below thereby liberating during the feeding operation a series of tongues from said strip, means for deflecting tongues in said strip subsequent to their liberation and a slitter for severing the strip lengthwise along a continuous line which will sever said tongues, for the purpose described, and a fly knife operated to chop across the roofing strip so as to bisect spaces left by removal of said tongues.

AMANDUS GRAU.
HERMAN R. FIEDLER.